July 15, 1924.　　　　　　　　　　　　　　　　1,501,457
J. KAESTNER
VEHICLE SPRING
Filed Jan. 10, 1923　　2 Sheets-Sheet 1
Fig. 1.
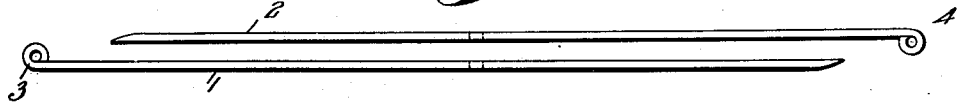
Fig. 2.
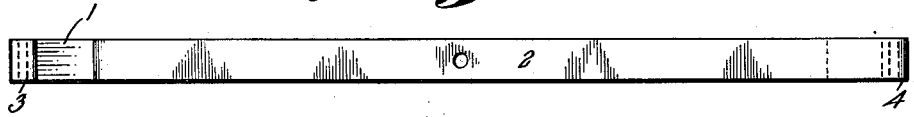
Fig. 3.
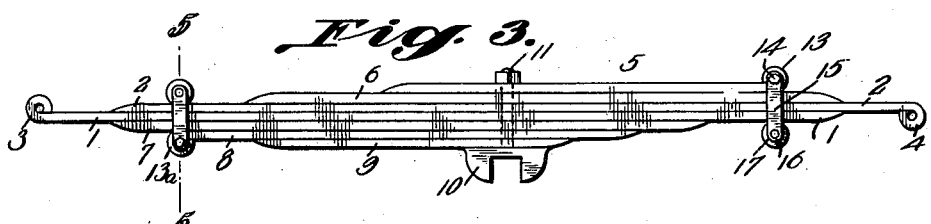
Fig. 4.
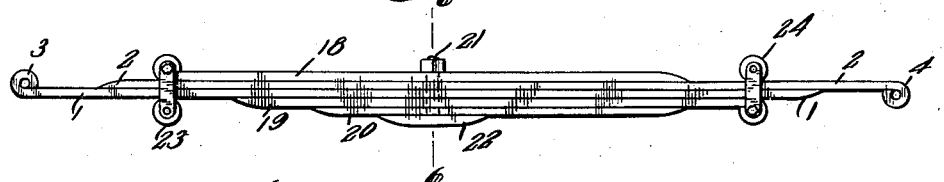
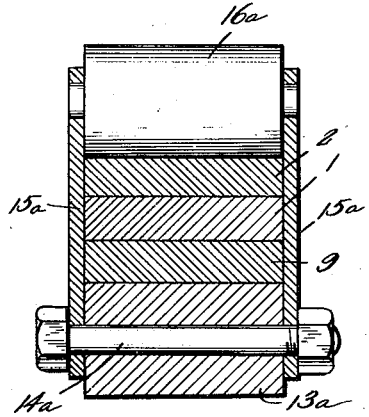
Fig. 5.
Fig. 6.
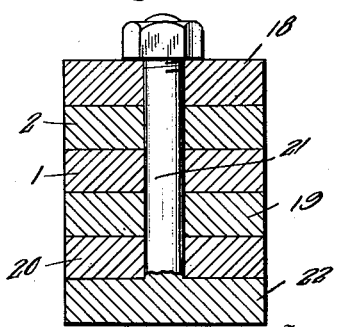
Inventor
J. Kaestner,
By C.A.Snow &Co.
Attorneys

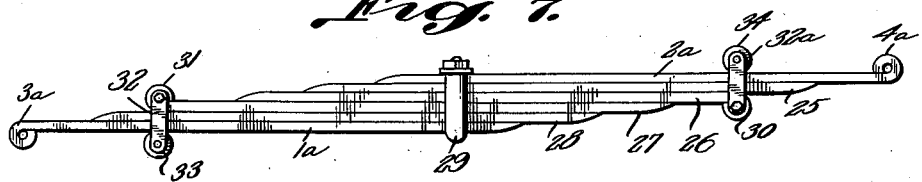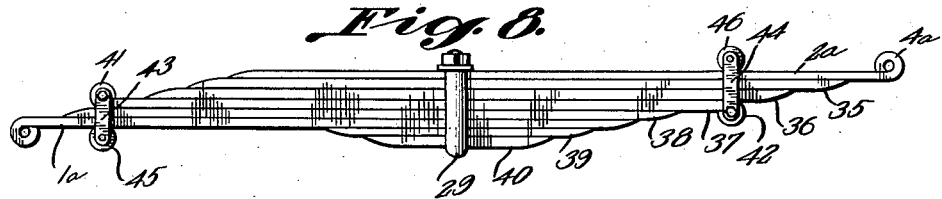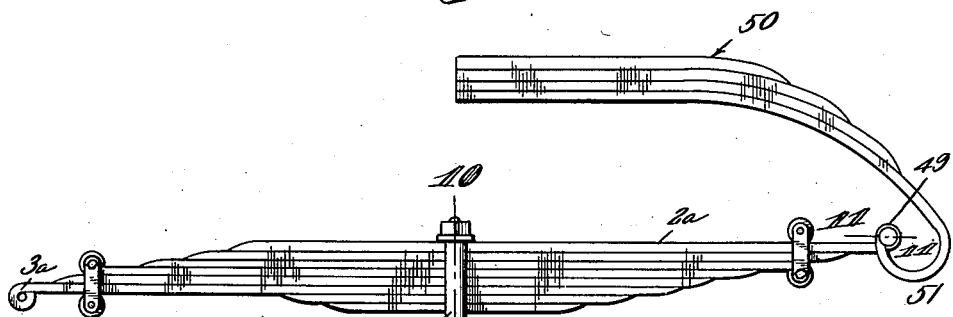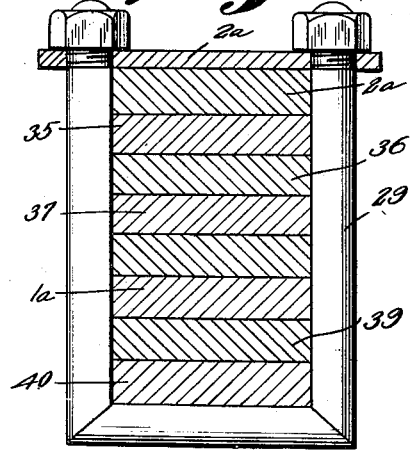

Patented July 15, 1924.

1,501,457

UNITED STATES PATENT OFFICE.

JOSEPH KAESTNER, OF BURLINGTON, IOWA.

VEHICLE SPRING.

Application filed January 10, 1923. Serial No. 611,796.

*To all whom it may concern:*

Be it known that I, JOSEPH KAESTNER, a citizen of the United States, residing at Burlington, in the county of Des Moines and State of Iowa, have invented a new and useful Vehicle Spring, of which the following is a specification.

This invention relates to leaf springs for vehicles and for all purposes for which such springs are employed.

The object of the invention is to provide a spring of this character so constructed as to give a smooth flexible riding effect with a stiff rebound action whereby one spring performs the tripple function of an ordinary vehicle spring, snubbers and shock absorbers, and the life as well as working efficiency of the spring is greatly increased.

Another object is to provide a spring of this character, one end of which carries the downward load while the other end resists the rebound.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of two of the leaves employed in one form of spring constructed in accordance with this invention, the leaves being separated and the connecting bolt omitted;

Fig. 2 is a top plan view thereof;

Fig. 3 is a side elevation showing another form of the invention;

Fig. 4 is a similar view showing still another form;

Fig. 5 is a transverse section taken on the line 5—5 of Fig. 3;

Fig. 6 is a similar view taken on the line 6—6 of Fig. 4;

Fig. 7 is a side elevation of the spring embodying another form of the invention;

Fig. 8 is a similar view of still another form;

Fig. 9 is a side elevation of the form shown in Fig. 8 applied to the ordinary springs of one make of car;

Fig. 10 is a transverse section taken on the line 10—10 of Fig. 9; and

Fig. 11 is a horizontal section taken on the line 11—11 of Fig. 9.

In the embodiment illustrated in Figs. 1 and 2, the spring constituting this invention comprises main spring leaves 1 and 2 equipped at their outer ends with eyes 3 and 4 respectively which constitute anchoring eyes, the eye 4 being downturned and the eye 3 up.

The main springs 1 and 2 are arranged in superposed relation in contact with each other, with their free ends terminating short of the spring eyes, Fig. 1 showing these leaves in open position prior to assembly. A connecting or clamping bolt, not shown, extends through these springs and is arranged nearer the eye carrying end than the other so that the leaves on either side of the bolt will be of different lengths, the longer end being designed to carry the downward load while the shorter end takes care of the rebound, and one end being anchored and the other loose and slidable produces a smooth flexible riding effect and at the same time a stiff rebound action.

The form shown in Fig. 3 employs two main leaves 1 and 2 having eyes 3 and 4 at their outer ends and have five reinforcing leaves arranged two above the main springs and three below. Those above the main springs are numbered 5 and 6, while those below the main spring are numbered 7, 8 and 9. A notched boss 10 is carried by the inner end of the lower face or leaf 9 and is designed for engagement with a portion of the vehicle chassis, not shown. This boss 10 has a bolt 11 preferably made integral therewith which extends through the superposed leaves of the spring and is equipped with a nut for holding them assembled.

In the form shown in Fig. 3, the eye 13 at its outer longer end through which extends a pintle 14 on which is mounted links 15 which straddle the other leaves of the spring and are connected at their lower ends by another pintle 16 which carries between the links a roller 17 which is designed to travel on the free end of the main spring.

The auxiliary spring 8 is provided at one end with an eye 13ª through which a pintle 14ª extends and which supports links 15ª which straddle the leaves of the spring and carry at their upper ends a roller 16ª which travels on the free end of the main leaf spring 2. This arrangement of rollers provides for the free sliding of the leaves without friction and also assists in holding them against lateral movement relatively to each other.

In the form shown in Fig. 4, the construction is the same as that shown in Fig. 3 except that three auxiliary leaves only are employed, one being arranged above spring 2 and numbered 18, while the other two, 19 and 20 are disposed below spring 1 and are held in operative position by a bolt 21 carried by a plate 22.

The auxiliary leaves 18 and 19 are each provided at one end with a link and roller construction similar to that shown in Fig. 3, the leaf 18 having a roller at one end while the leaf 19 carries a roller at the end opposite to the roller carrying end of the spring 18, the rollers being numbered 23 and 24, respectively.

In the form shown in Fig. 7, the main leaf springs 1ª and 2ª are equipped at their outer ends with anchoring eyes 3ª and 4ª respectively and between these leaves are disposed a plurality of auxiliary or reinforcing leaves, four being here shown and numbered respectively, 25, 26, 27 and 28 and are held assembled by a U-shaped clamping bolt 29.

The auxiliary spring 26 has an eye 30 at one end and the spring 27 which is arranged directly below it has an eye 31 at its opposite end. These eyes support pairs of links as 32 which straddle the adjacent links of the spring, the links 32 extending downwardly and carrying between them a roller 33 which travels on the lower face of the main spring 1ª, while the links 32ª extend upwardly and carry a roller 34 which travels on the upper face of the main leaf or spring 2ª.

It is of course to be understood that any desired number of reinforcing leaves may be used according to the weight the spring is designed to support.

The form shown in Fig. 8 is similar to that shown in Fig. 7 except that it employs six auxiliary leaves numbered respectively, 35, 36, 37, 38 and 39 and 40, some of which are arranged between the main leaf springs 1ª and 2ª and some below the lowermost main spring 1ª.

The auxiliary leaf 37 is equipped at its opposite ends with eyes 41 and 42 which support pairs of links as 43 and 44, the links 43 extending downwardly and supporting between their lower ends a roller 45 which travels on the lower face of the spring 1ª while the links 44 extend upwardly and carry a roller 46 which travels on the upper face of the leaf 20.

The form shown in Fig. 9 is exactly like that shown in Fig. 8 except having a vehicle spring 50 connected with one end thereof through the anchoring eye 4ª. One leaf of the spring 50 has a downwardly and inwardly hook-shaped end 51 which is bifurcated and between the furcations 52 and 53 is located the eye 4ª and is connected therewith by a pintle 53 which is here shown in the form of a bolt.

All of the forms above described are designed for use with vehicles of different weights, the form shown in Figs. 1, 2 and 4 being designed for light vehicles. It is of course understood that the spring may be made with any desired number of auxiliary or reinforcing leaves to suit various loads, and the gist of the invention resides in providing the main leaves with one anchoring end and one loose slidable end which produces a smooth flexible riding effect and at the same time a stiff rebound action operating as an ordinary spring, snubbers and shock absorbers.

Various changes in the form, shape, proportion and other minor details of construction may be made without departing from the principle or sacrificing any of the advantages of the claimed invention.

I claim:—

1. A spring of the class described composed of two parallel leaves each having an eye at one end and its other end rectilinear and free with reinforcing spring leaves arranged above and below the main leaves respectively, a bolt connecting the leaves of said spring at one side of the median line thereof, so that one end of each leaf is shorter than the other, the longer ends being designed to carry the downward load and the shorter ends to resist the rebound, the reinforcing leaves being one provided at one end with a yoke-like member straddling the superposed leaves and equipped with a roller to travel on one of said leaves, and another of said reinforcing leaves being provided at the opposite end of the spring with a similar roller to ride on opposed faces of the spring.

2. A spring of the class described composed of two parallel leaves each having an eye at one end and its other end rectilinear and free with reinforcing leaves arranged above and below the main leaves, respectively, a bolt connecting the leaves of said spring at one side of the median line thereof so that one end of each leaf is shorter than the other, the longer ends being designed to carry the downward load and the shorter ends to resist the rebound, one of the outer reinforcing springs having pivotal connection with one end thereof, a yoke adapted to straddle the other leaves and provided with a roller to travel on the other outermost leaf, the last mentioned leaf being equipped at its other end with a similar yoke and roller operating on the first mentioned reinforcing leaf.

In testimony that I claim the foregoing as my own, I have hereto affixed my signature in the presence of two witnesses.

JOSEPH KAESTNER.

Witnesses:
  GEO. E. WHEELER,
  F. E. COOPER.